May 29, 1956 V. ZONA 2,747,225
APPARATUS FOR SHAPING TIRE CASINGS
Filed June 10, 1952 7 Sheets-Sheet 1

Inventor
VITTORIO ZONA
By Young, Emery & Thompson
Attorneys

Inventor
VITTORIO ZONA

Inventor
VITTORIO ZONA
By Young Emery + Thompson
Attorney

May 29, 1956 V. ZONA 2,747,225
APPARATUS FOR SHAPING TIRE CASINGS
Filed June 10, 1952 7 Sheets-Sheet 6

Inventor
VITTORIO ZONA
By Young Emery & Thompson
Attorneys

United States Patent Office 2,747,225
Patented May 29, 1956

2,747,225
APPARATUS FOR SHAPING TIRE CASINGS

Vittorio Zona, Milan, Italy, assignor to Pirelli S. p. A., Milan, Italy

Application June 10, 1952, Serial No. 292,684

Claims priority, application Italy October 25, 1951

3 Claims. (Cl. 18—17)

It is known that in the manufacture of motorcar tires a basic operation is performed before the vulcanisation, that is the so-called "shaping" operation, consisting in causing the flat built tire band to assume a toroidal shape corresponding to the final shape of the tire after the vulcanisation.

Various apparatus have been proposed heretofore for effecting said shaping operation.

Apparatus of various kinds are used, in combination with an external mechanical shaping device, and an inner shaping expansible core having a toroidal shape and annular section, similar to the normal air tubes but having a greater thickness and a thicker trapezoidal section portion in its equatorial area. With such an arrangement it is possible to effect the vulcanisation in a separate step outside of the apparatus, on the same shaping core, but this has many drawbacks, the main of which is that great quantities of rubber are required for the manufacture of the core. The core is subjected to high local stresses while being inserted into the shaping device and forced into the tire, also in the subsequent vulcanising operation, since its section is bound to expand very much. Moreover, the large thickness of the core delays the propagation of heat during the vulcanisation and the core permits only the use of inlet and outlet valves for the heating fluid having very small ports, which throttle the flow of said fluid and very often becomes clogged causing thus the tires to be spoiled during the vulcanisation.

In order to eliminate the said drawbacks, it has been proposed to substitute for the toroidal core a cylindrical elastic drum the edges of which are clamped so as to be easily brought together or removed from each other, while the cylindrical elastic wall under the action of a fluid blown therein and deforming same outwards shapes the tire band previously fitted onto the elastic drum.

This however, requires that the vulcanisation be effected on the same apparatus so that the two still widely used procedures in the tire manufacture of the kettle vulcanisation or of vulcanisation in separate moulds cannot be used. On the other hand, the apparatus, due to the fact that it performs the three operations of shaping, vulcanising the tire and removing it from the core, comprises a great number of mechanisms which make said procedures very complicated and expensive.

An object of the present invention is to provide an apparatus for shaping a flat-built tire band and removing the tire from the core substantially based on the use of a pneumatic core formed so as to eliminate all the drawbacks of the annular air tubes, which apparatus is capable of being indifferently employed in combination either with the kettle vulcanisation or with the single or double moulds vulcanisation.

The invention relates to an apparatus comprising a frame, two circular plates coaxially mounted thereon for movement along the common axis and engaging said annular beads to approach same to one another, a pneumatic core in the shape of a flattened cylinder having a diameter substantially corresponding to the inner diameter of the shaped tire and having a single circular mouth of reduced diameter centrally located on one of the end walls, a central opening in one of said plates corresponding to said mouth, a suction and blowing head passing through said opening and extending into said mouth, means in said suction and blowing head cooperating with an inner edge of said opening for detachably keeping the core in its mouth, a stem axially slidable in said head and cooperating with the core wall opposite to said mouth for deforming said core, and means for connecting the inside of said core alternatively with a vacuum and pressure supply.

For a better understanding of the invention the same will now be described more fully with reference to the accompanying drawings, in which.

Figures 2, 2A:
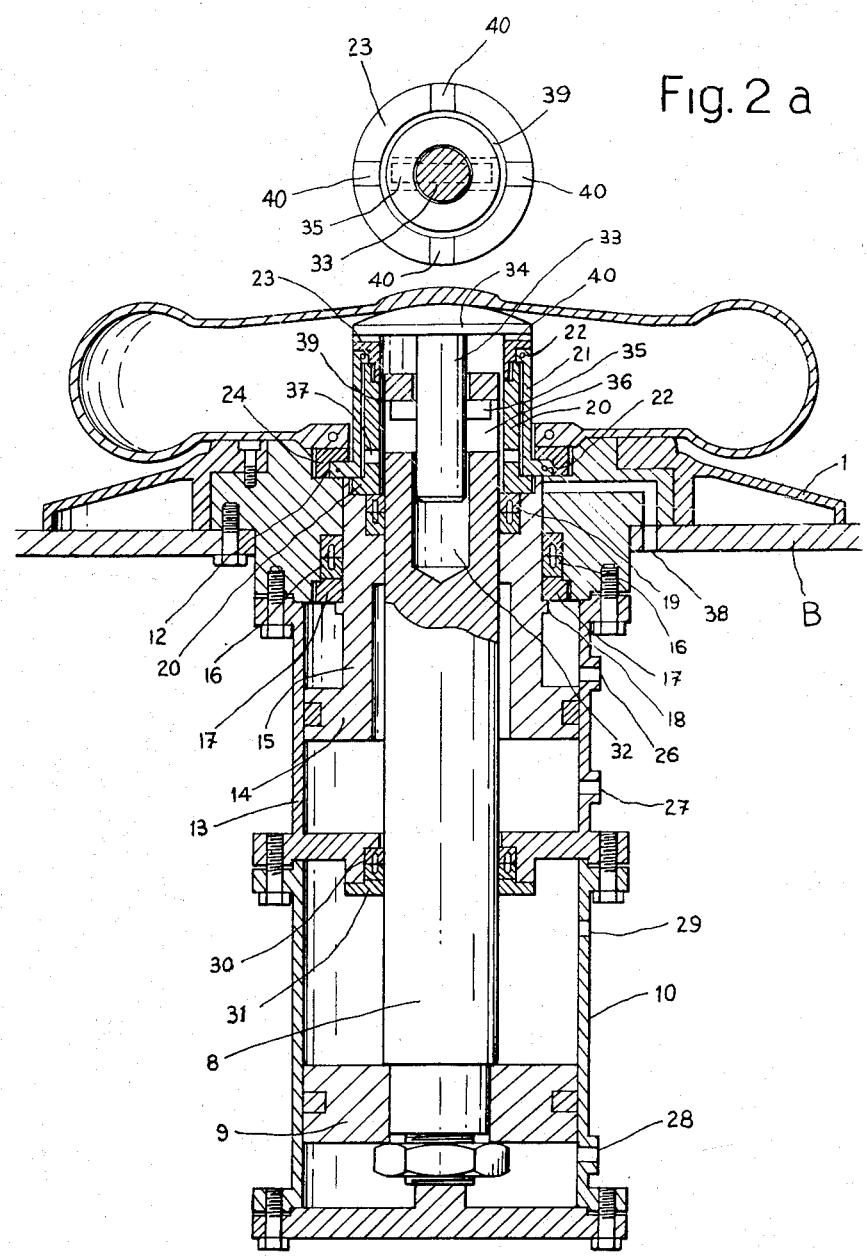
Fig. 2 is a sectional view on enlarged scale of a detail of the control mechanism of the pneumatic core in rest position.
Figure 3:
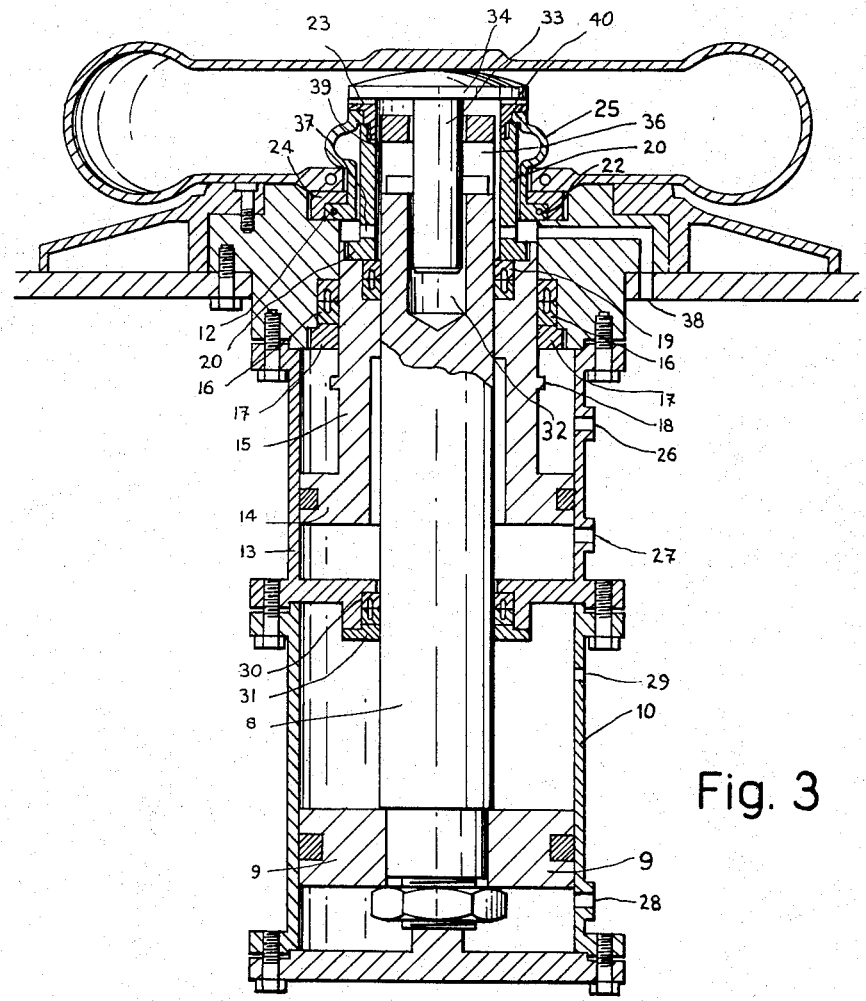
Figure 4:
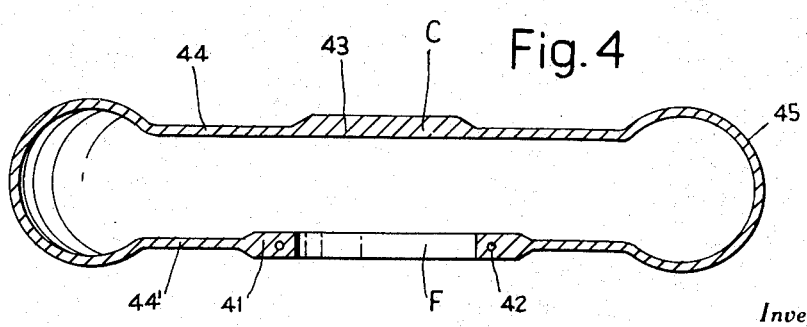
Figure 5:
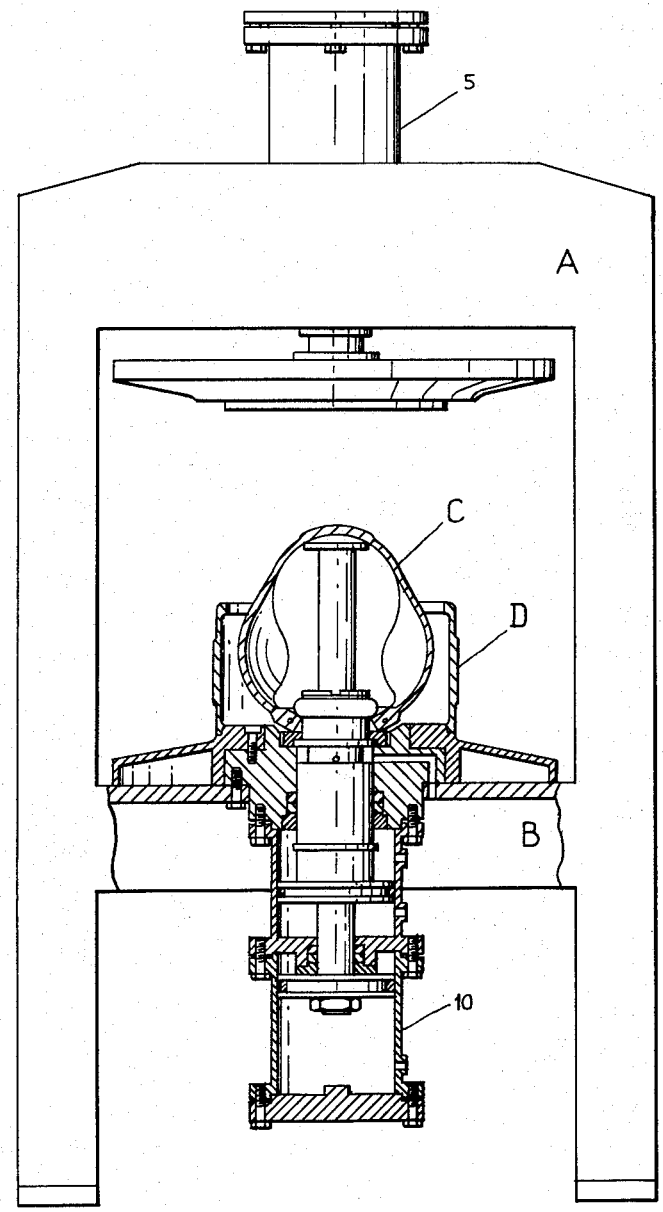
Figure 6:
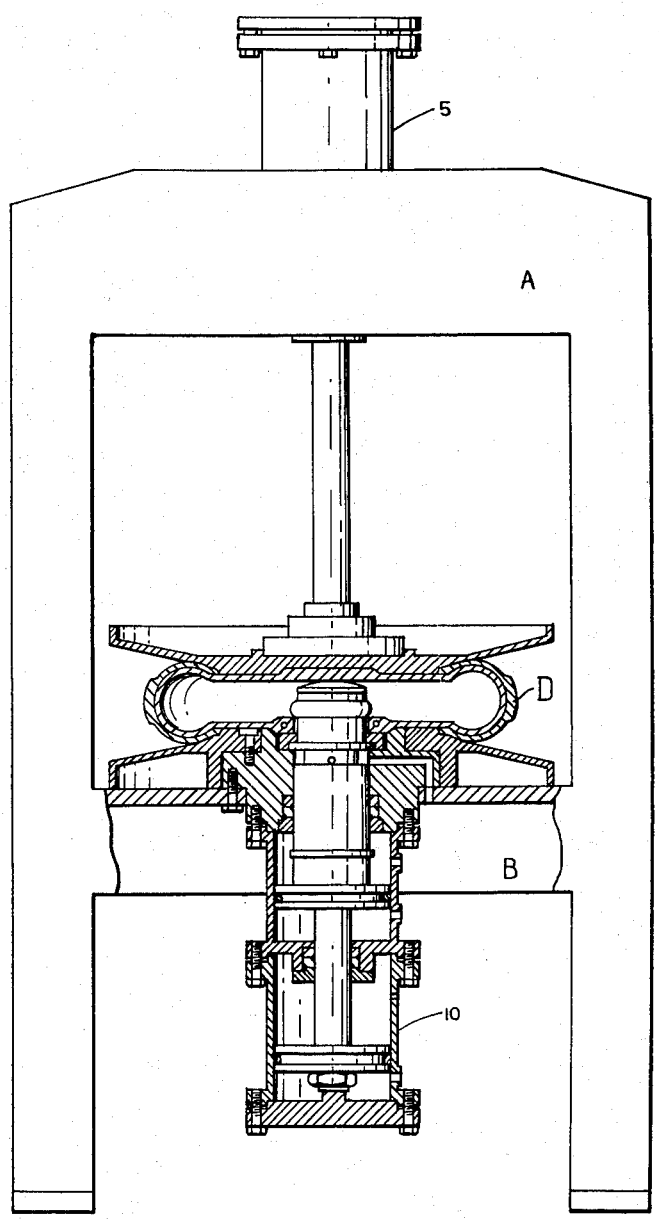
Figure 7:
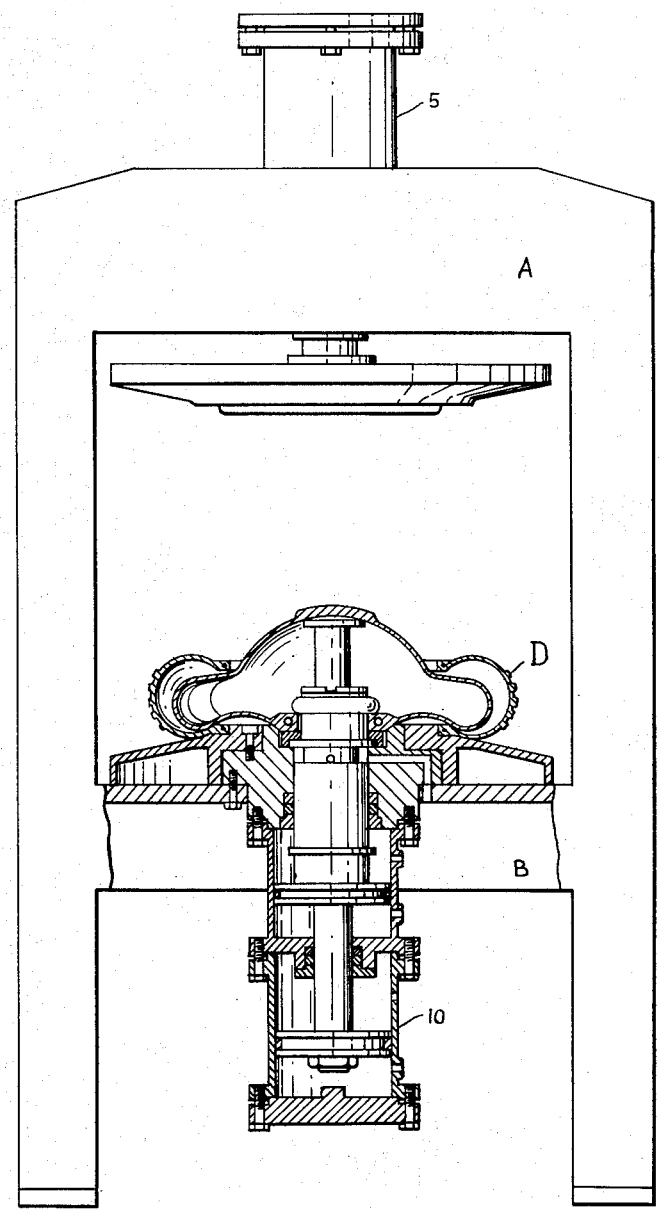
Figure 8:
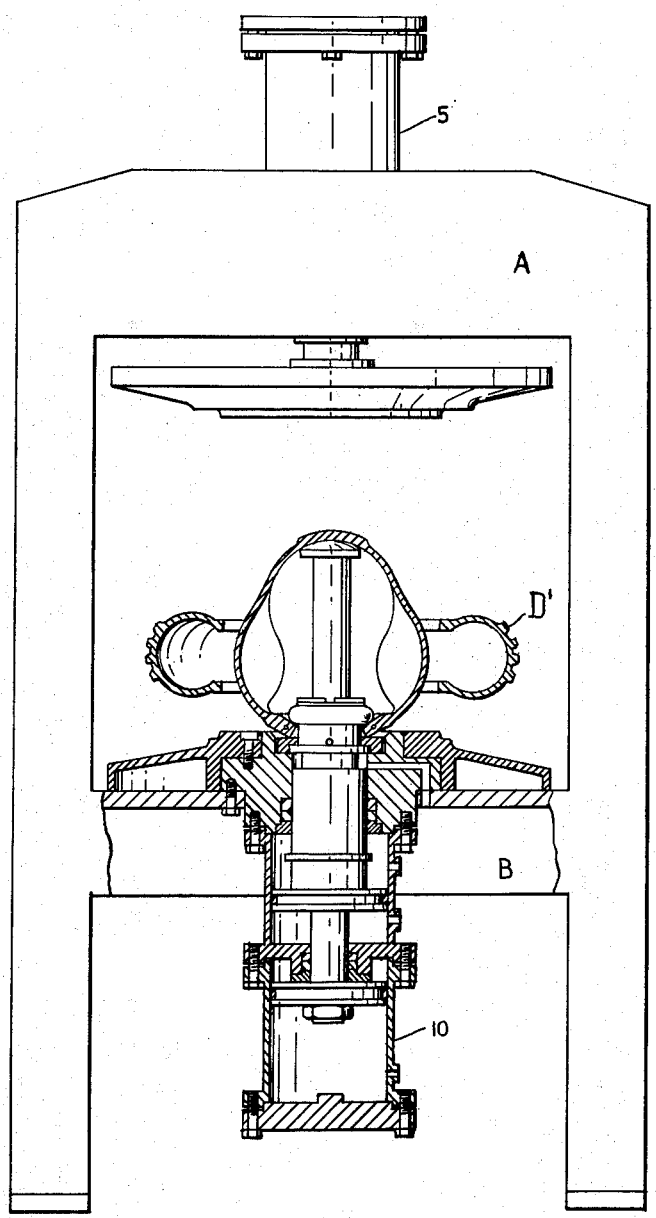

Fig. 2 bis is a sectional view taken on line II—II of Fig. 2;

Fig. 3 is a section analogous to that of Fig. 2 showing the mechanism in a different position;

Fig. 4 is a diametral sectional view of the pneumatic core;

Fig. 5 is a front view of the apparatus with some parts in section after that the flat built tire band has been applied onto the expansible core;

Fig. 6 is a front view analogous to that of Fig. 5 showing the various parts after shaping of the tire;

Figs. 7 and 8 are views analogous to those of Figs. 5 and 6 showing how the apparatus is utilized for the extraction of the pneumatic core from the vulcanized tire.

Figure 1:
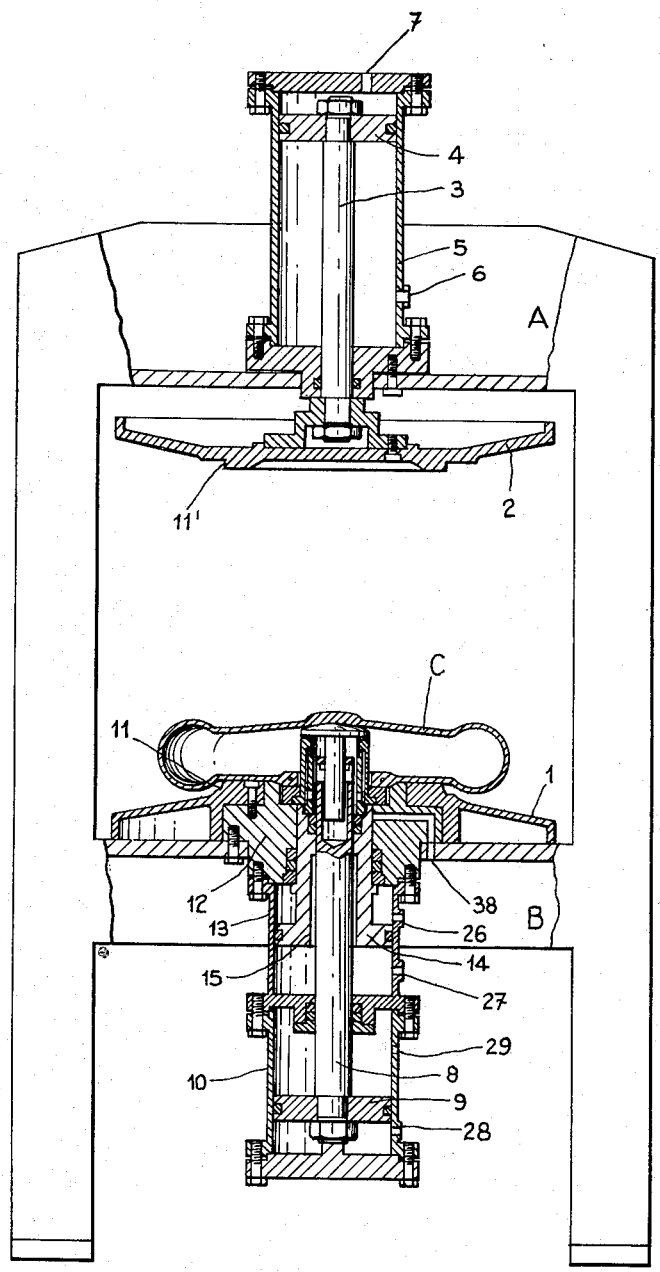
Fig. 1 is a front view of the apparatus with sectioned operative parts.

With reference to Fig. 1 the apparatus comprises a frame A having two plates 1 and 2, arranged along the same geometric axis. The lower plate 1 is fixed to a cross beam B of the frame, while the upper plate 2 is connected to a stem 3 controlled by a piston 4 sliding within a double acting cylinder 5 provided with two ports 6 and 7 for the admission and the discharge of a fluid under pressure.

The profiles of the plates 1 and 2 have a flat central portion followed by an annular step, 11 and 11' respectively, followed in turn by diverging areas which follow for a length the profile of the shaped tire, while the remaining portion is rectilinear. The steps 11 and 11' correspond to the beading of the tire band to be shaped, the two plates 1 and 2 being so arranged that they can easily be changed according to the variations of said beading.

These plates co-operate with a pneumatic deformable core C for shaping the tire. This core has the shape of a flattened cylinder the diameter of which is greater than its height (Fig. 4) and the end wall 44 of which has a center portion 43 of greater thickness, opposite which on the other end wall 44' is located the mouth F. The reinforced brim 41 of said mouth F is provided with a metallic insert 42, or an insert of any other material, for example textile fabric, applied outside of said brim. The central portion 43 can be reinforced with stiffening material either embodied therein or applied to its surface.

The lower plate 1 is associated with a central body 12 also fixed to the cross beam B, inside of which is located a device for keeping locked onto plate 1 the core C with the brim of its mouth (Fig. 4) and a device for deforming the core C for allowing the tire to be shaped to be fitted thereon.

The above devices are hereinafter more fully described.

To the lower end of body 12 (Fig. 2) is secured, for example by means of a flange and bolt connection, a cylinder 13 connected in its turn to a single acting cylinder 10, wherein a piston 9 is slidably mounted integral with a stem 8 placed on the same geometric axis of stem 3. Within cylinder 13 slides a piston 14 connected to a hollow stem 15 coaxial with stem 8 sliding in the manner of a telescope along same. The hollow stem 15 is mounted in sealing relation at its outer face by means of a double packing 16 (for super pressure and sub-atmospheric pressure), locked by a ring 17 threaded onto body 12; it is furthermore provided with a flange 18 stopping the upward stroke; the inner sealing is obtained by means of a double packing 19 held by the lower flange of a sleeve 20 which passes through the mouth F of the core C, onto which is fitted in the manner of a sheath, a cylindrical hose 21 of yielding material. Said hose is provided at its extremities with two small metal rings 22 and 22'. These rings are fixed to sleeve 29 integral with the hollow stem 15 and consequently movable, and to fixed body 12, respectively by rings 23 and 24. The hose 21 is therefore in a position as to enable the rings 22, 22' to move towards each other causing thus the bulging of its profile, so as to form an elastic flange 25 (Fig. 3) when the hollow stem moves downwardly. Such a bulging locks the brim of the mouth F of core C onto plate 1 and effects at the same time a sealing closure of its inner cavity. This bulging is obtained by blowing a fluid under pressure into cylinder 13 through port 26, while, to cause the hose 21 to take up its former position, the above said fluid is discharged through port 26 by forcing a fluid under pressure through port 27.

The hollow stem 15 is crossed by stem 8 which has at its upper end a hole 32 housing a cylindrical stem 33 of a head 34 penetrating inside of core C through mouth F and on which rests the reinforced central portion 43 of the bottom of said core. The stem 33 is crossed by a pin 35 slidable in suitable slots 36 in stem 8 so as to allow head 34 to lean against ring 23 fixed to the hollow stem 15 during the downwards stroke of this latter (Figs. 2 and 3), without disengaging from stem 8 for the subsequent operating phases (Figs. 3, 5, 7, 8).

The stem 8 is controlled by means of piston 9 by introducing therein fluid under pressure through port 28 for the useful upwards stroke designed to deform the core C, while the equilibrium condition with the outside atmosphere is established through vent 29, and a packing 30, held by a ring 31, prevents the adjacent cylinders 10 and 13 from intercommunicating. The return stroke of stem 8 is caused by the pushing action of the upper plate 2 during its downward stroke, as explained further on.

The sleeve 20 has a number of ports 37, which when the hose 21 is bulging are in communication with duct 38 (Fig. 3) allowing a fluid under pressure blown into duct 38, to penetrate into the inner cavity of core C along the annular duct 39 located between the sleeve 20 and the stem 8 and the radial ducts 40 machined in the upper end of ring 23. In the same way it is possible to obtain the collapsing of the core C by making the duct 38 communicate with a pneumatic suction piping.

The apparatus according to the exemplifying embodiment of the invention operates as described hereinafter.

When the parts of the apparatus are in the position shown in Figs. 1 and 2, the core C is placed onto plate 1 and its mouth F fitted onto the elastic hose 21; by blowing a fluid under pressure through port 26, said hose bulges forming flange 25 yieldingly sealing the mouth F of core C, which is thereby held in place. By blowing fluid under pressure through port 28, the stem 8 is pushed upwards thus causing a "cowl" extension (Fig. 5) of the core C, the toroidal portion 45 of which becomes narrower at its periphery. Said narrowing can be highly enhanced by applying a vacuum to the inner cavity of the core through duct 38.

It is thus possible to fit the flat-built tire band D (Fig. 5) onto core C which engages with step 11. Plate 2 is then lowered until its step 11' engages the corresponding beads of the tire band D and by continuing the downwards push of the plate 2 and by admitting fluid under pressure into core C the shaping of the tire band D will be obtained (Fig. 6).

After the fluid under pressure has been discharged from core C and mouth F disengaged, by discharging the fluid from port 27, and after the plate 2 has been lifted, the assembly formed by the tire and the expansible core can be removed and the tire vulcanized.

The withdrawal of the shaping core from the tire after the vulcanisation has been effected, is accomplished in the following manner. The assembly tire-core is mounted on the apparatus and the mouth F of the core is locked with the above described mechanism; thereafter, the core is extracted from the vulcanized tire by pushing the stem 8 upwardly and by simultaneously applying a vacuum in the core (Fig. 7). There is thus the possibility of removing the tire from the apparatus (Fig. 8), while the core remains in a suitable position for receiving a next flat-built tire band to be shaped.

From the foregoing, it appears clear that practical embodiments of the apparatus can undergo many variations and modifications without departing from the scope of the invention. In fact, it is of no importance that the frame has a vertical instead of a horizontal or oblique axis, or that the upper plate instead of the lower one is fixed, or that both are movable; or also, that the deforming stem of the core penetrates into the cavity thereof causing the support of the core to move instead of the stem. Likewise, it is of no importance that the relative movement of the parts occurs by means of rigid members, such as screws, cams, gearings and so on instead of by means of fluids under pressure.

What I claim is:

1. An apparatus for shaping a flat-built tire band by making it adhere, by approaching of its annular beads, to a pneumatic core remaining associated with the tire during the vulcanization and for removing said core from said tire after the vulcanization, comprising a frame, a circular plate fixedly mounted thereon, a double acting cylinder comprising a piston and stem mounted on said frame, a circular plate mounted on said stem and being coaxial with said fixed plate, whereby said movable plate may be moved to and from said fixed plate along said axis, said plates engaging said annular beads to approach same towards one another, a pneumatic core in the form of a flattened cylinder, said core having end walls, and being of a diameter substantially corresponding to the inner diameter of the shaped tire, one of said core end walls having a single reduced diameter circular mouth centrally located therein, said fixed plate having a central opening corresponding to said mouth, a suction and blowing head passing through said opening and extending into said mouth, means in said suction and blowing head cooperating with an inner edge of said opening for detachably keeping the core at its mouth, a stem axially slidable in said head and cooperating with the core wall opposite to said mouth for deforming said core, means for connecting the inside of said core alternatively with a vacuum and a pressure supply, a single acting cylinder having a piston, said stem being connected to said latter mentioned piston, a second double acting cylinder connected in series with the single acting cylinder and having a piston, the suction and blowing head being fixed to the piston of said second double acting cylinder and being mounted in the manner of a telescope with respect to said stem.

2. An apparatus as claimed in claim 1, wherein the outer upper edge of the suction and blowing head is connected with the inner edge of said opening in said fixed circular plate by a cylindrical hose of yielding material, said hose forming an annular rib for fixing the mouth of the pneumatic core between said plate and said suction and blowing head when this latter is made to partially move back into said plate, the stem for deforming the core being mounted, below said hose, in sealing relation inside of said head, side passages being provided between said plate and said head and between said head and said stem for placing the inner portion of said expansible core alternatively in communication with a vacuum and with a pressure supply externally of said frame.

3. An apparatus as claimed in claim 2, in which the brim of the mouth of the pneumatic core and a portion corresponding thereto of the opposed end wall are thicker than the remaining parts of the core and are provided with reinforcing means.

References Cited in the file of this patent
UNITED STATES PATENTS

| | | |
|---|---|---|
| 1,947,258 | Gay | Feb. 13, 1934 |
| 2,065,943 | Lerch et al. | Dec. 29, 1936 |
| 2,296,800 | Soderquist | Sept. 22, 1942 |
| 2,495,664 | Soderquist | Jan. 24, 1950 |